United States Patent
Jaradi et al.

(10) Patent No.: US 11,505,159 B2
(45) Date of Patent: Nov. 22, 2022

(54) SEATBELT HEIGHT ADJUSTER

(71) Applicant: Ford Global Technologies, LLC, Dearborn, MI (US)

(72) Inventors: Dean M. Jaradi, Macomb, MI (US); Huipeng Chen, Canton, MI (US); Mohammad Omar Faruque, Ann Arbor, MI (US); S. M. Iskander Farooq, Novi, MI (US); Zhenyan Gao, Northville, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 868 days.

(21) Appl. No.: 16/392,689

(22) Filed: Apr. 24, 2019

(65) Prior Publication Data

US 2020/0339063 A1 Oct. 29, 2020

(51) Int. Cl.
*B60R 22/20* (2006.01)
*B60R 21/013* (2006.01)
*B60R 21/01* (2006.01)
*B60R 21/00* (2006.01)

(52) U.S. Cl.
CPC .......... *B60R 22/202* (2013.01); *B60R 21/013* (2013.01); *B60R 2021/0009* (2013.01); *B60R 2021/01265* (2013.01); *B60R 2022/208* (2013.01)

(58) Field of Classification Search
CPC .......... B60R 2021/0009; B60R 22/203; B60R 22/202; B60R 2021/01265; B60R 22/201; B60R 21/013; B60R 2022/208; B60R 22/205

USPC .......................................................... 297/473
See application file for complete search history.

(56) References Cited

U.S. PATENT DOCUMENTS

| | | | |
|---|---|---|---|
| 4,564,219 A * | 1/1986 | Baden | B60R 22/201 280/801.2 |
| 4,884,825 A | 12/1989 | Grunewald et al. | |
| 5,167,428 A * | 12/1992 | Garret | B60R 22/205 248/297.31 |
| 5,265,908 A | 11/1993 | Verellen et al. | |
| 5,294,150 A | 3/1994 | Steffens, Jr. | |
| 5,615,917 A * | 4/1997 | Bauer | B60R 22/206 297/483 |
| 7,198,300 B2 | 4/2007 | Daume et al. | |
| 7,806,439 B2 | 10/2010 | Clute | |
| 8,002,358 B2 * | 8/2011 | Marriott | B60R 22/201 280/808 |
| 8,136,841 B2 | 3/2012 | Omiya et al. | |
| 9,421,944 B2 | 8/2016 | Cuddihy et al. | |
| 9,623,836 B2 * | 4/2017 | Kujawa | B60R 22/24 |

(Continued)

FOREIGN PATENT DOCUMENTS

| | | | |
|---|---|---|---|
| DE | 102013000525 A1 | 7/2014 | |
| WO | WO-0126937 A1 * | 4/2001 | B60N 2/508 |

*Primary Examiner* — Milton Nelson, Jr.
(74) *Attorney, Agent, or Firm* — Frank A. MacKenzie; Bejin Bieneman PLC (57) ABSTRACT

A seatbelt height adjuster includes a track elongated along an axis and including a plurality of holes spaced from each other along the axis, a slider slideably coupled to the track, a D-ring supported by the slider, a pin supported by the slider and releasably engageable with one respective hole, and a pyrotechnic actuator supported by the slider and engaged with the pin.

20 Claims, 8 Drawing Sheets

(56) References Cited

U.S. PATENT DOCUMENTS 9,632,836 B2 4/2017 Kujawa et al.
9,809,193 B2 * 11/2017 Marriott .................. B60R 22/28

* cited by examiner

SEATBELT HEIGHT ADJUSTER

BACKGROUND

Vehicles include seatbelts for each of the seats. The seatbelt includes webbing that, when the seatbelt is buckled, extends across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band. A D-ring is mounted to the pillar of the vehicle and supports the seat belt at shoulder level of the occupant.

The D-ring may be vertically adjustable along the pillar to accommodate varying shoulder heights of different occupants. For example, the D-ring may be manually adjustable. A mechanical feature may be releasably fixed between the D-ring and the pillar and may be released by the occupant to adjust the D-ring along the pillar.

DETAILED DESCRIPTION

A seatbelt height adjuster includes a track elongated along an axis and including a plurality of holes spaced from each other along the axis, a slider slideably coupled to the track, a D-ring supported by the slider, a pin supported by the slider and releasably engageable with one respective hole, and a pyrotechnic actuator supported by the slider and engaged with the pin.

The seatbelt height adjuster may include a processor and a memory storing instructions to actuate the pyrotechnic actuator in response to detecting an oblique impact.

The pyrotechnic actuator may be designed to release the pin from a locked position to an unlocked position.

The seatbelt height adjuster may include a bracket supported by the slider and engaged with the pin. The bracket may be designed to release the pin from a locked position to an unlocked position.

The seatbelt height adjuster may include a spring supported by the slider and engaged with the pyrotechnic actuator. The spring may be fixed to the pin and biasing the pin towards one respective hole.

The seatbelt height adjuster may include a leaf spring supported by the slider and engaged with the pyrotechnic actuator. The leaf spring may be fixed to the pin and biasing the pin towards one respective hole.

The leaf spring may be pivotable relative to the slider from a lowered position to a raised position by the pyrotechnic actuator. The pin may be engaged with the track when the leaf spring is in the lowered position and may be disengaged from the track when the leaf spring is in the raised position.

The seatbelt height adjuster may include a wedge supported by the slider and engaged with the pyrotechnic actuator. The wedge may be compressed between the leaf spring and the slider.

The wedge may be slidable from a first position to a second position by the pyrotechnic actuator. The pin may be engaged with the track when the wedge is in the first position and may be disengaged with the track when the wedge is in the second position.

The leaf spring may be pivotable relative to the slider from a lowered position to a raised position by the wedge. The leaf spring may be in the lowered position when the wedge is in the first position and may be in the raised position when the wedge is in the second position.

The wedge may be elongated transverse to the leaf spring.

The slider may include wedge guides spaced from each other along the axis. The wedge may extend from one wedge guide to the other wedge guide.

The seatbelt height adjuster includes a cable extending from the pyrotechnic actuator to the wedge.

The seatbelt height adjuster may include a bracket fixed relative to the wedge and including a base spaced from the wedge. The bracket may extend partially around the track.

The wedge may be slidable from a first position to a second position by the bracket. The pin may be engaged with the track when the wedge is in the first position and may be disengaged with the track when the wedge is in the second position by the bracket.

The bracket may include a spring extending from the base to the track. The spring may bias the wedge in the first position.

The leaf spring may be pivotable relative to the slider from a lowered position to a raised position by the wedge. The leaf spring may be in the lowered position when the wedge is in the first position and may be in the raised position when the wedge is in the second position.

The seatbelt height adjuster may include a stopper fixed to the track. The slider may be engageable with the stopper.

The pyrotechnic actuator may include a wire elongated along the axis. The wire may be coiled about the axis.

The seatbelt height adjuster may include a webbing extending through the D-ring.

With reference to the Figures, wherein like numerals indicate like parts throughout the several views, a vehicle 10 is generally shown. The vehicle 10 includes a seatbelt assembly 12 having a seatbelt height adjuster 14 including a track 16 elongated along an axis A and including a plurality of holes 18 spaced from each other along the axis A, a slider 20 slideably coupled to the track 16, a D-ring 22 supported by the slider 20, a pin 24 supported by the slider 20 and releasably engageable with one respective hole 18, and a pyrotechnic actuator 26 supported by the slider 20 and engaged with the pin 24.

The seatbelt assembly 12 may be engageable with a seat 28, as discussed below. During a vehicle impact, the momentum of an occupant may bias the occupant relative to the seat 28. For example, in a front impact or an oblique impact, the momentum of the occupant may bias the occupant away from the seat 28. When the occupant moves away from the seat 28, the seatbelt assembly 12 may exert a force on the occupant to retain the occupant on the seat 28. In this situation, the pyrotechnic actuator 26 may be actuated to release the pin 24, which allows the slider 20 to slide relative to the track 16. When the slider 20 slides in the track 16, the D-ring 22 moves downwardly along the track 16, i.e., along the axis A, which limits the load on the occupant when the seatbelt assembly 12 retains the occupant on the seat 28. Specifically, as the D-ring 22 moves downwardly, i.e., along the axis A, the seatbelt assembly 12 may redistribute the load on the occupant, which may reduce momentum of the occupant while also limiting chest compression of the occupant during the vehicle impact.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in a vehicle fore-and-aft direction Da. Each side of the vehicle 10 may be similar or identical to each other.

Figure 1:
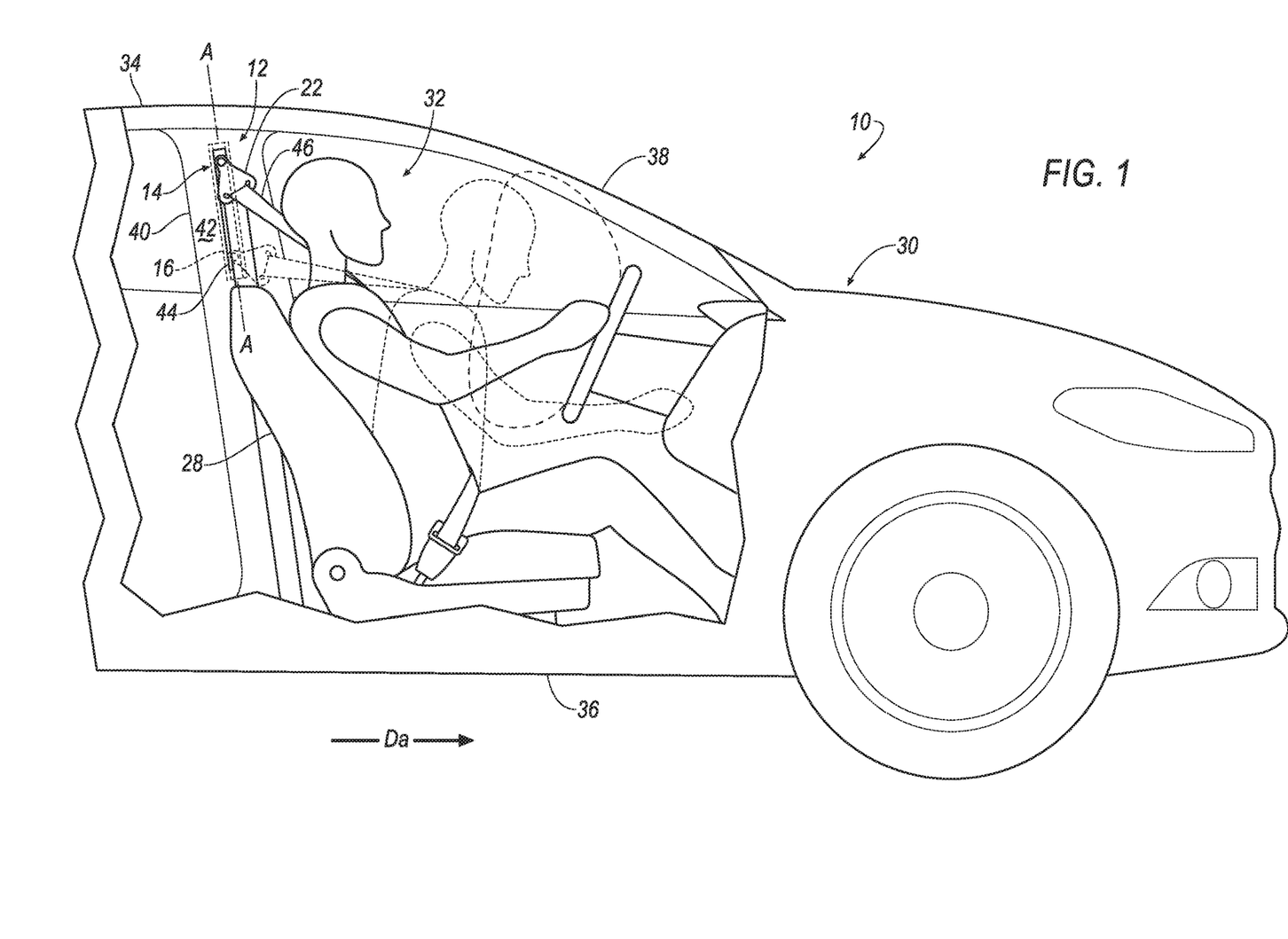
FIG. 1 is a side view of a vehicle including a D-ring in a first position and moveable relative to a B-pillar to a second position shown in hidden lines.

With reference to FIG. 1, the vehicle 10 includes a body 30 defining a passenger cabin 32. The passenger cabin 32 houses occupants, if any, of the vehicle 10. The passenger cabin 32 includes a front end (not numbered) and a rear end (not numbered) with the front end being in front of the rear end during forward movement of the vehicle 10. The passenger cabin 32 includes one or more seats 28. The seats 28 may be arranged in any suitable arrangement. For example, one or more of the seats 28 may be at the front end of the passenger cabin 32, i.e., a front seat, and/or one or more of the seats 28 may be at the rear end of the passenger cabin 32, i.e., a rear seat.

With continued reference to FIG. 1, the body 30 may include a roof 34, a floor 36 spaced from the roof 34, and a plurality of pillars 38, 40 extending downwardly from the roof 34, i.e., generally towards the floor 36. The roof 34 and the floor 36 may each extend across the passenger cabin 32, i.e., from one side to the other side of the vehicle 10 and from the front end to the rear end of the passenger cabin 32. The roof 34 may define an upper boundary of the passenger cabin 32 and the floor 36 may define a lower boundary of the passenger cabin 32.

With continued reference to FIG. 1, the pillars 38, 40 may include an A-pillar 38 disposed adjacent the front end of the passenger cabin 32, and a B-pillar 40 spaced from the A-pillar 38 in the vehicle fore-and-aft direction Da. The front seats 28 may, for example, be disposed between the A-pillar 38 and the B-pillar 40. The pillars 38, 40 may include additional pillars, e.g., a C-pillar (not shown). Each side of the vehicle 10 may include the plurality of pillars 38, 40. In other words, the vehicle 10 may include two A-pillars 38 and two B-pillars 40, e.g., one A-pillar 38 and one B-pillar 40 is disposed on each side of the vehicle 10.

With continued reference to FIG. 1, a pillar trim 42 may be attached to the B-pillar 40. The pillar trim 42 may extend at least partially along the B-pillar 40. For example, the pillar trim 42 may be monolithic, e.g., a single piece extending from the roof 34 to the floor 36. As another example, the pillar trim 42 may include a plurality of components that are separately formed and subsequently attached together. The pillar trim 42 may be attached to the B-pillar 40 by in any suitable manner, e.g., clips, fasteners, etc. The pillar trim 42 may be any suitable material, e.g., plastic, vinyl, etc.

With continued reference to FIG. 1, the pillar trim 42 may, for example, include a slot 44 elongated along the B-pillar 40, e.g., along the axis A. The slot 44 may extend through the pillar trim 42 in the cross-vehicle direction Dc. The slot 44 may, for example, face towards the front seats 28. The seatbelt height adjuster 14 may be engaged with the slot 44. For example, the seatbelt height adjuster 14 may be disposed in the slot 44 and be slidable relative to the slot 44. Specifically, the D-ring 22 may extend through the slot 44 and be slidable along the slot 44.

The pillar trim 42 may include a second slot (not shown) spaced from the slot 44. The second slot may be elongated along the B-pillar 40, i.e., generally vertically. The second slot may extend through the pillar trim 42 in the vehicle fore-and-aft direction Da. In other words, the second slot may extend through the pillar trim 42 transverse to the slot 44. Said differently, the second slot may, for example, face the A-pillar 38. The seatbelt height adjuster 14 may be engaged with the second slot. For example, the seatbelt height adjuster 14 may be disposed in the second slot and be slidable relative to the second slot, as set forth further below.

Each seat 28 is supported by the floor 36, as shown in FIG. 1. The position and orientation of the seats 28 and components thereof may be adjustable by an occupant. In this situation, each seat 28 may slide relative to the floor 36, e.g., in the vehicle fore-and-aft direction Da, along a seat track (not shown). As another example, each seat 28 may be fixed relative to the floor 36. In this situation, the seats 28 may be immovable relative to the floor 36. Each seat 28 is disposed adjacent to one respective B-pillar 40.

The vehicle 10 may include any suitable number of seatbelt assemblies 12. For example, the vehicle 10 may include one seatbelt assembly 12 for each seat 28. In such an example, each seatbelt assembly 12 may be disposed adjacent to one seat 28. Each seatbelt assembly 12, when fastened, retains the occupant on the respective seat 28, e.g., during sudden decelerations of the vehicle 10.

The seatbelt assembly 12 may include a seatbelt retractor (not shown) and a webbing 46 retractably payable from the retractor. Additionally, the seatbelt assembly 12 may include an anchor (not shown) coupled to the webbing 46, and a clip (not numbered) that engages a seatbelt buckle (not numbered).

The retractor may be attached to the body 30. For example, the retractor may be attached to the B-pillar 40. As another example, when the restraint system is adjacent the rear seat 28, the retractor may be attached to the C-pillar. Alternatively, the retractor may be attached to the front seat 28, e.g., a frame (not shown) of the front seat 28. The retractor may be attached to the body 30 in any suitable manner, e.g., fasteners.

The webbing 46 may include a first end (not shown) and a second end (not numbered). The webbing 46 extends continuously from the first end to the second end. The first end of the webbing 46 is retractably engaged with the retractor, i.e., feeds into the retractor. The second end of the webbing 46 may be attached to the anchor. The anchor may, for example, be attached to the body 30, e.g., the B-pillar 40, the floor 36, etc. Alternatively, the anchor may be attached to the seat 28, e.g., a seat bottom. The anchor may be attached to the body 30 in any suitable manner, e.g., with fasteners. The webbing 46 may be a woven fabric, e.g., woven nylon.

The clip may be slidably engaged with the webbing 46. The clip may, for example, slide freely along the webbing 46 and selectively engage with the seatbelt buckle. In other words, the webbing 46 may be engageable with the seatbelt buckle. The clip may, for example, be releasably engageable with the seatbelt buckle from a buckled position to an unbuckled position. In the buckled position, the webbing 46 may be fixed relative to the seatbelt buckle. In other words, the seatbelt buckle may prevent the webbing 46 from retracting into the retractor. When the clip is engaged with the seatbelt buckle, i.e., in the buckled position, the clip may divide the webbing 46 into a lap band and a shoulder band. In the unbuckled position, the clip may move relative to the seatbelt buckle. In other words, the webbing 46 may be retractable into the retractor.

The seatbelt assembly 12 may be a three-point harness meaning that the webbing 46 is attached at three points around the occupant when fastened: the anchor, the retractor, and the seatbelt buckle. The restraint system may, alternatively, include another arrangement of attachment points.

The track 16 may be fixed to one pillar, e.g., adjacent to one seat 28. For example, the track 16 may be fixed to the B-pillar 40, as shown in FIG. 1. The track 16 may be fixed to the B-pillar 40 in any suitable manner, e.g., fasteners, adhesive, welding, etc. The track 16 may be elongated along the B-pillar 40. In other words, the axis A may extend along the B-pillar 40, e.g., from the roof 34 towards the floor 36. The track 16 may be aligned with the slot 44 of the pillar trim 42, as shown in FIG. 1.

Figure 2:
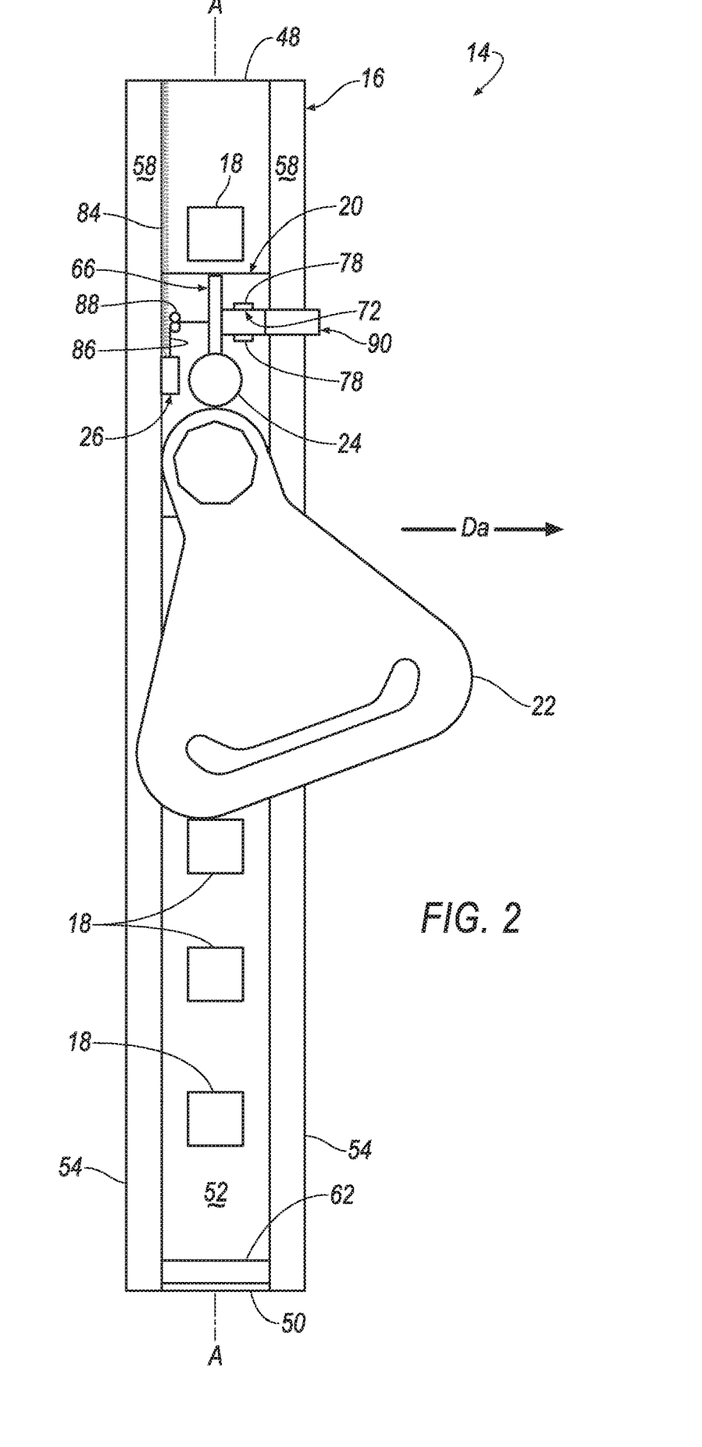
FIG. 2 is a side view of the seatbelt height adjuster including the D-ring.

With reference to FIG. 2, the track 16 may include a top 48 and a bottom 50 spaced from each other along the axis A. The track 16 may include a guide surface 52 extending from the top 48 to the bottom 50. The track 16 may include sides 54 spaced from each other in the vehicle fore-and-aft direction Da. The sides 54 may be elongated along the axis A from the top 48 to the bottom 50. The guide surface 52 may extend from one side 54 to the other side 54 of the track 16.

The track 16 may include a groove 60 disposed on at least one side 54 of the track 16. For example, the track 16 may include one groove 60, as shown in FIGS. 3A-4C. In this situation, the groove 60 may face the second slot of the pillar trim 42. The groove 60 may be elongated along the axis A, e.g., from the top 48 to the bottom 50 of the track 16. The groove 60 may extend towards the other side 54 of the track 16, i.e., in the vehicle fore-and-aft direction Da. The groove 60 may extend any suitable amount in the vehicle fore-and-aft direction Da, i.e., have any suitable depth. As another example, the track 16 may include one groove 60 disposed on each side 54 of the track 16. In such an example, the slider 20 may be engaged with each groove 60.

The sides 54 of the track 16 may define a channel 56 therebetween. For example, the channel 56 may extend from one side 54 of the track 16 to the other side 54 of the track 16, as shown in FIGS. 3B and 4C. The channel 56 may be elongated along the axis A, e.g., from the top 48 to the bottom 50 of the track 16. In this situation, each side 54 may include an extension 58 extending from the respective side 54 toward the other side 54. Each extension 58 may be spaced from the guide surface 52, as shown in FIGS. 33B and 4C. In other words, the channel 56 may extend from the guide surface 52 to the extensions 58 in the cross-vehicle direction Dc. Said differently, the extensions 58 may partially define the channel 56. The extensions 58 may be spaced from each other in the vehicle fore-and-aft direction Da. In other words, the extensions 58 may extend partially across the guide surface 52.

With reference to FIG. 2, a stopper 62 may be disposed in the channel 56, i.e., the stopper 62 may extend across the track 16. The stopper 62 may be designed to slow or stop the movement of the slider 20 in the track 16. In other words, the stopper 62 is in the translational path of the slider 20. Specifically, the stopper 62 may be disposed between the slider 20 and the bottom 50 of the track 16. The stopper 62 may be spaced from the bottom 50 of the track 16 by any suitable amount. The stopper 62 may be fixed to the track 16. The stopper 62 may be fixed to the track 16 by any suitable manner, e.g., fasteners, welding, press-fit, etc. The stopper 62 may be any suitable material, e.g., metal, rubber, plastic, etc.

With continued reference to FIG. 2, the plurality of holes 18 may extend through the guide surface 52, e.g., in the cross-vehicle direction Dc. The plurality of holes 18 may be disposed between the sides 54, and specifically, the extensions 58, in the vehicle-fore-and-aft direction Da. The holes 18 may be spaced from each other along the axis A. The holes 18 may be spaced from each other by any suitable amount. The holes 18 may have any suitable shape, e.g., circular, square, rectangular, etc. The holes 18 may have any suitable size, e.g., diameter, perimeter, etc. The track 16 may include any suitable number of holes 18.

With reference to FIGS. 3B and 4C, the slider 20 may abut the guide surface 52. The slider 20 may be disposed in the channel 56, i.e., between the sides 54 of the track 16. The slider 20 may, for example, extend from one side 54 to the other side 54 of the track 16. Alternatively, the slider 20 may be spaced from at least one side 54 of the track 16. Additionally, the slider 20 may be spaced from the extensions 58. In other words, the slider 20 may be thinner than the channel 56 in the cross-vehicle direction Dc.

Figure 3A:
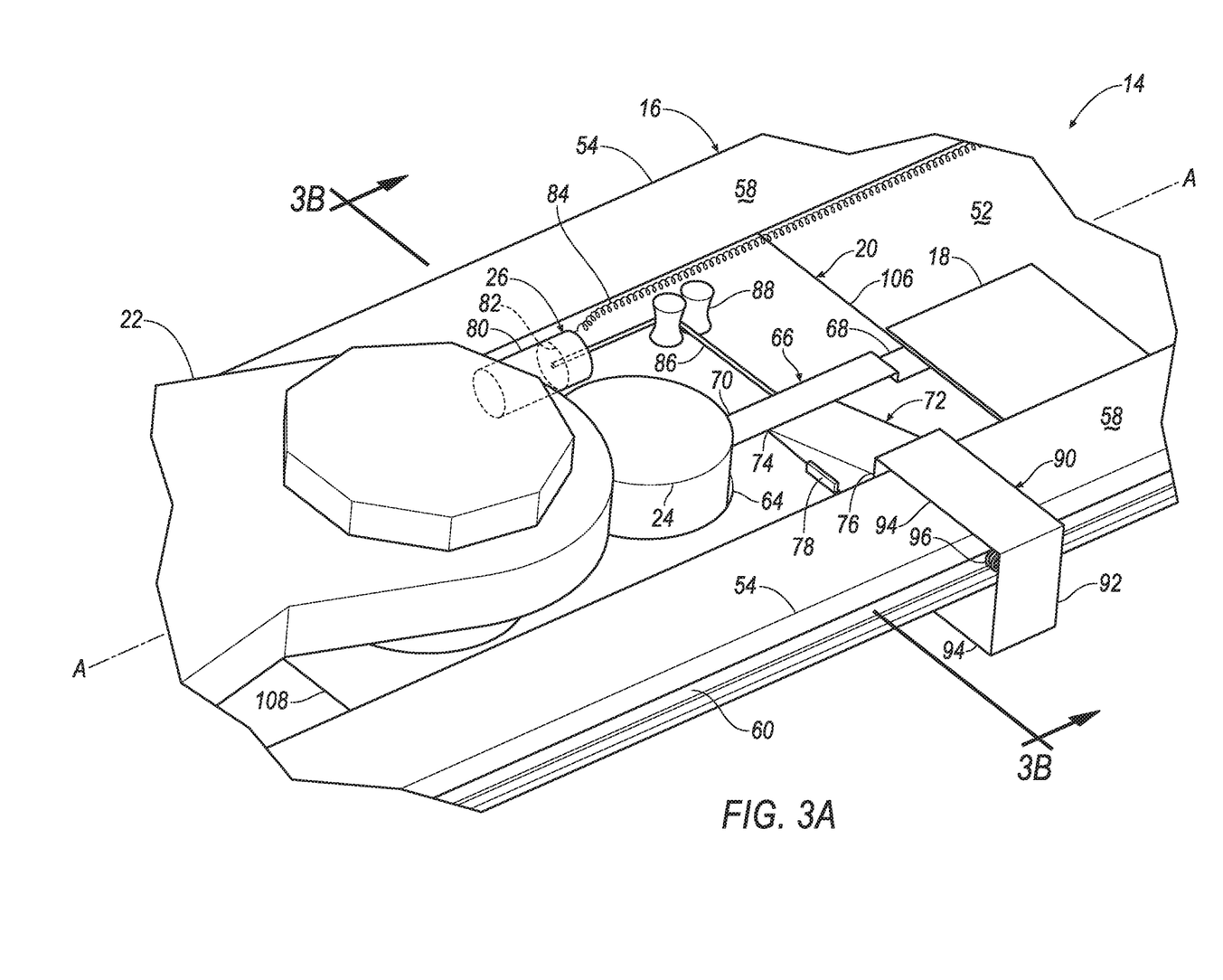
FIG. 3A is a perspective view of the seatbelt height adjuster including a pin in a locked position.
Figure 3B:
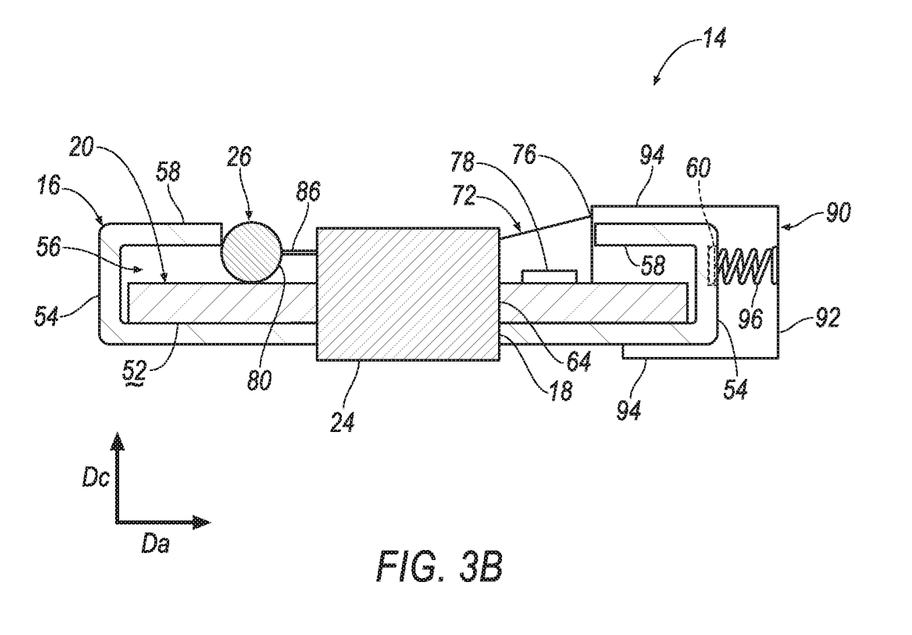
FIG. 3B is a cross-sectional view along line 3B of the seatbelt height adjuster in FIG. 3A.
Figure 4A:
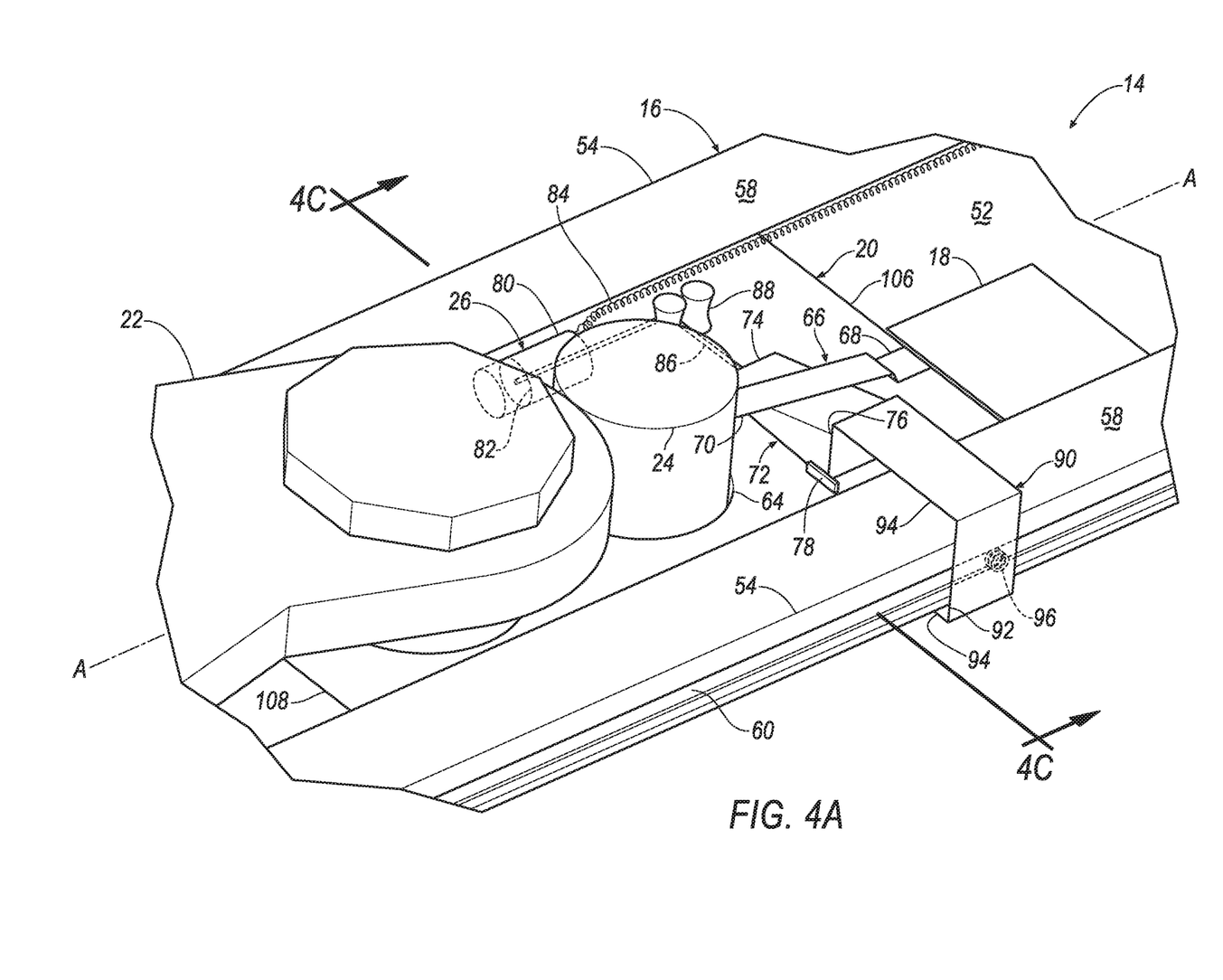
FIG. 4A is a perspective view of the seatbelt height adjuster including a pyrotechnic actuator in a discharged position and the pin in an unlocked position.
Figure 4B:
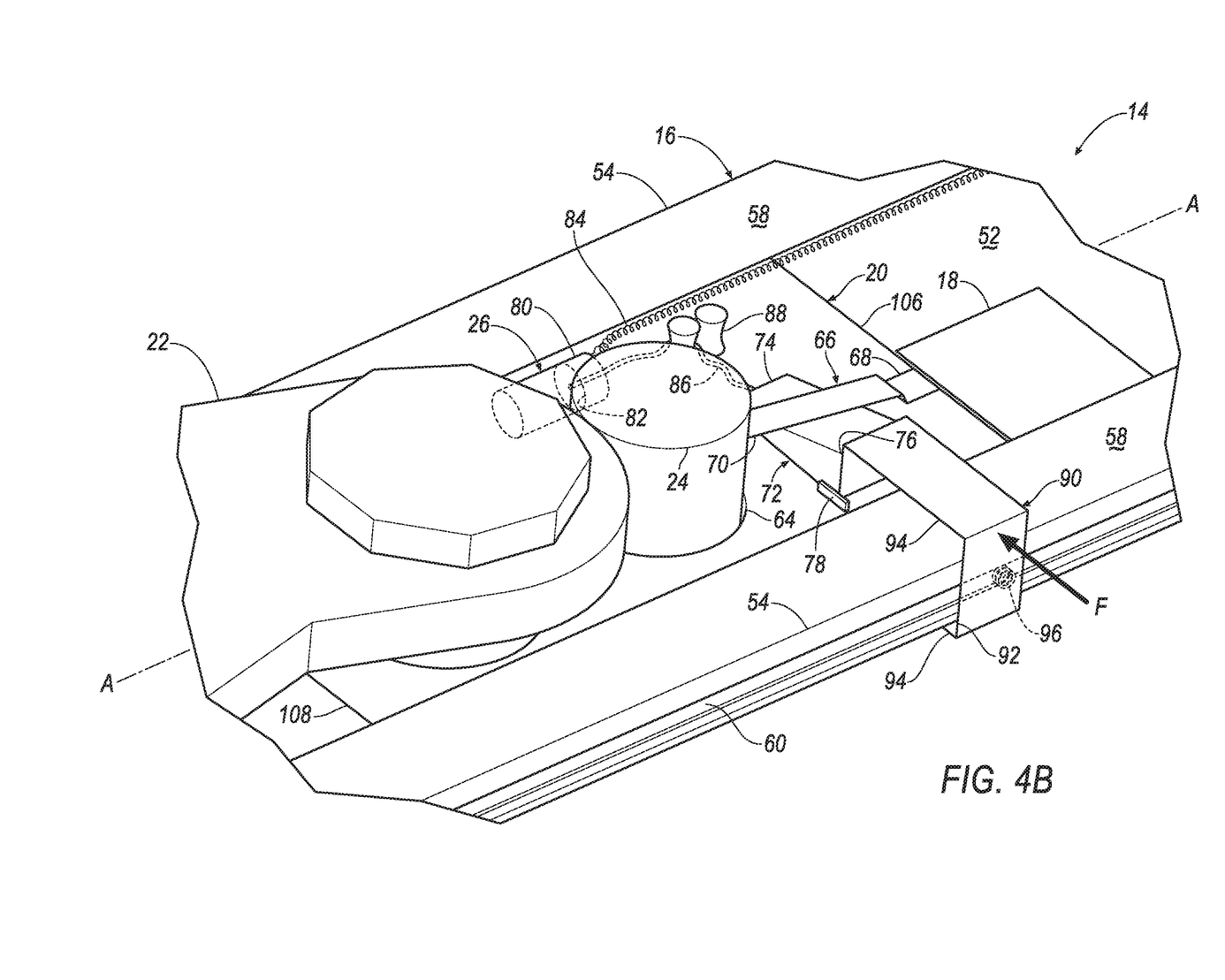
FIG. 4B is a perspective view of the seatbelt height adjuster including a bracket in a disengaged position and the pin in an unlocked position.
Figure 4C:
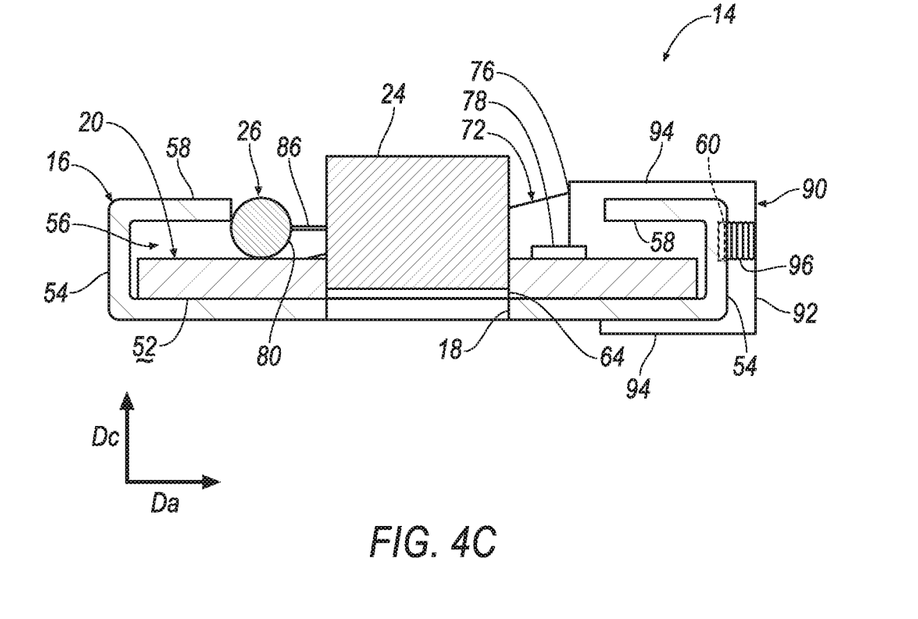
FIG. 4C is a cross-sectional view along line 4C of the seatbelt height adjuster in FIG. 4A.

The slider 20 may have a top 106 and a bottom 108 spaced from the top 106 along the axis A, as shown in FIGS. 3A, 4A, and 4B. The top 106 and bottom 108 may be spaced from each other by any suitable amount. In other words, the slider 20 may be any suitable size. The slider 20 may have any suitable shape, e.g., rectangular, square, etc. The slider 20 may be any suitable material, e.g., metal, plastic, etc.

The slider 20 may include an opening 64 disposed between the top 106 and the bottom 108 of the slider 20, as shown in FIGS. 3A, 4A, and 4B. The opening 64 may extend through the slider 20. The opening 64 may have any suitable shape, e.g., square, rectangular, circular, etc. The opening 64 may have a same or different shape as the plurality of holes 18. The opening 64 may have any suitable size, e.g., diameter, perimeter, etc. The opening 64 may have a same or different size as the plurality of holes 18.

As set forth above, the D-ring 22 is supported by the slider 20. For example, the D-ring 22 may be fixed to the slider 20, e.g., by fasteners. As shown in FIGS. 3A, 4A, and 4B, the D-ring 22 may be disposed below the opening 64 of the slider 20. In other words, the D-ring 22 may be fixed to the slider 20 between the opening 64 and the bottom 108 of the slider 20. The D-ring 22 may be fixed to the slider 20 by any suitable manner, e.g., fasteners.

The D-ring 22 may be in a first position when the slider 20 is spaced from the stopper 62, as shown in FIG. 2. The D-ring 22 may be slidable relative to the track 16 to a plurality of first positions. In other words, the D-ring 22 may be disposed at any suitable first position. In this situation, the D-ring 22 may be fixed relative to the track 16 during normal operation of the vehicle 10. Specifically, the pin 24 may be engaged with one respective hole 18. Additionally, the D-ring 22 may be slidable to a second position, shown in hidden lines in FIG. 1. In the second position, the slider 20 may be engaged with, i.e., abutting, the stopper 62. In this situation, the pin 24 may be disengaged from the plurality of holes 18, as discussed further below.

The D-ring 22 supports the webbing 46 and redirects tension applied thereto. The D-ring 22 may include a slot (not numbered). The webbing 46 may be slidably disposed within the slot of the D-ring 22. In other words, the webbing 46 may freely slide through the D-ring 22. For example, the clip may be disposed between the anchor and the D-ring 22 to pull the webbing 46 from the unbuckled position to the buckled position. The D-ring 22 may be metal, plastic, or any suitable material.

The pin 24 may be disposed in the opening 64 of the slider 20 as shown in FIGS. 3A, 4A-4C. Specifically, the pin 24 extends through the opening 64 of the slider 20 in the locked position, as shown in FIG. 3B. In other words, the pin 24 may extend in the cross-vehicle direction Dc. The pin 24 may be designed to extend through the opening 64 in the slider 20 and one respective hole 18 of the track 16 in the locked position. In other words, the pin 24 may have any suitable size and shape to extend through the slider 20 and one respective hole 18 of the track 16. The pin 24 may have any suitable shape, e.g., cylindrical, rectangular, etc. Additionally, one end pin 24 may be tapered towards the track 16. The pin 24 may be any suitable material, e.g., metal, plastic, etc.

The pin 24 may be releasably engageable from a locked position, shown in FIGS. 3A and 3B to an unlocked position, e.g., relative to the slider 20 and the track 16, shown in FIGS. 4A-4C. Specifically, the pin 24 may be releasably engageable relative to one respective hole 18 of the track 16. The pin 24 may be released by the pyrotechnic actuator 26, as discussed below. In the locked position, the pin 24 may be engaged with one respective hole 18 of the track 16. For example, the pin 24 may be disposed in one respective hole 18 of the track 16 in the locked position. As another example, the pin 24 may extend through the one respective hole 18 of the track 16 in the locked position. In the locked position, the pin 24 may prevent the slider 20 from moving relative to the track 16. In other words, the pin 24 may fix the slider 20 relative to the track 16 in the locked position. In the unlocked position, the pin 24 may be spaced from, i.e., disengaged with, the plurality of holes 18 in the track 16. In the unlocked position, the slider 20 may move relative to the track 16.

With reference to FIGS. 3A, 4A, and 4B, the seatbelt height adjuster 14 may include a spring 66 supported by the slider 20 and engaged with the pyrotechnic actuator 26. For example, the spring may be a leaf spring 66. The leaf spring 66 may include a first end 68 and a second end 70 spaced from the first end 68 along the axis A. The leaf spring 66 may be elongated from the first end 68 to the second end 70. The first end 68 of the leaf spring 66 may be fixed to the slider 20, e.g., adjacent to the top 106 of the slider 20. The second end 70 of the leaf spring 66 may be fixed to the pin 24. Said differently, the pin 24 may be fixed relative to the leaf spring 66. The leaf spring 66 may be any suitable material, e.g., metal, plastic, etc. The leaf spring 66 may be fixed to the pin 24 and the slider 20 in a same or different manner. The leaf spring 66 may be fixed to the pin 24 and the slider 20 in any suitable manner, e.g., fasteners, welding, adhesive, etc.

The leaf spring 66 may be pivotable relative to the slider 20 from a lowered position, shown in FIGS. 3A and 3B to a raised position, e.g., about the first end 68, shown in FIGS. 4A-4C. The second end 70 of the leaf spring 66 is farther from the slider 20 in the cross-vehicle direction Dc when the leaf spring 66 is in the raised position than in the lowered position. In other words, the leaf spring 66 may pivot about the first end 68 towards the occupant in the raised position. The leaf spring 66 may be pivoted by the pyrotechnic actuator 26, as discussed below.

The leaf spring 66 may bias the pin 24 in the locked position. In other words, the leaf spring 66 may bias the pin 24 towards one respective hole 18 of the track 16. For example, under normal operating conditions, the leaf spring 66 is in the lowered position. The pin 24 is in the locked position when the leaf spring 66 is in the lowered position. In other words, the pin 24 is in the locked position under normal operating conditions. The pin 24 is in the unlocked position when the leaf spring 66 is in the raised position. In other words, when the leaf spring 66 pivots to the raised position, the pin 24 disengages one respective hole 18 of the track 16 since the pin 24 is fixed relative to the second end 70 of the leaf spring 66.

With reference to FIGS. 3A-4C, the seatbelt height adjuster 14 may include a wedge 72 supported by the slider 20. The wedge 72 may be engaged with the pyrotechnic actuator 26. The wedge 72 may be disposed between the top 106 of the slider 20 and the pin 24. The wedge 72 may be elongated in the vehicle fore-and-aft direction Da. In other words, the wedge 72 may be elongated transverse to the leaf spring 66. The wedge 72 may include a first end 74 and a second end 76 spaced from the first end 74 in the vehicle fore-and-aft direction Da. The second end 76 of the wedge 72 may be disposed adjacent to one extension 58, and the first end 74 of the wedge 72 may disposed adjacent to the leaf spring 66. The second end 76 of the wedge 72 may extend in the cross-vehicle direction Dc farther than the first end 74 of the wedge 72. In other words, the second end 76 of the wedge 72 may be taller than the first end 74 of the wedge 72 relative to the slider 20. Said differently, the wedge 72 may include an inclined surface (not numbered) extending from the first end 74 to the second end 76. The wedge 72 may be any suitable material, e.g., metal, plastic, etc.

The wedge 72 may be slidable relative to the slider 20 from a first position, shown in FIGS. 3A and 3B, to a second position, shown in FIGS. 4A-4C. The wedge 72 may be slidable in the vehicle fore-and-aft direction Da. In the second position, the second end 76 of the wedge 72 may be spaced from both extensions 58. In other words, the wedge 72 may move away from one extension 58, i.e., towards the other extension 58, during movement from the first position to the second position. The wedge 72 may be slid by the pyrotechnic actuator 26, as discussed below. Under normal operating conditions, the wedge 72 is in the first position. When the wedge 72 is in the first position, the pin 24 is in the locked position. The pin 24 is in the unlocked position when the wedge 72 is in the second position. In other words, the pin 24 may disengage one respective hole 18 in the track 16 when the wedge 72 moves from the first position to the second position.

The wedge 72 may be compressed between the leaf spring 66 and the slider 20. For example, the leaf spring 66 may extend across the wedge 72 and abut the wedge 72. Specifically, the leaf spring 66 may abut, i.e., be engaged with, the inclined surface of the wedge 72. In the first position, the first end 74 of the wedge 72 may be compressed between the leaf spring 66 and the slider 20, as shown in FIG. 3A. In the second position, the leaf spring 66 may be disposed closer to the second end 76 of the wedge 72. For example, the leaf spring 66 may extend across the wedge 72, e.g., between the first end 74 and the second end 76, as shown in FIGS. 4A and 4B. The wedge 72 may move the leaf spring 66 between the lowered position and the raised position during movement of the wedge 72 between the first position and the second position. In this situation, the wedge 72 may pivot the leaf spring 66 to the raised position since the leaf spring 66 is engaged with the inclined surface of the wedge 72. In other words, as the wedge 72 moves between the first position and the second position, the leaf spring 66 is pivoted by the inclined surface of the wedge 72. Said differently, the leaf spring 66 is in the lower position when the wedge 72 is in the first position, and the leaf spring 66 is in the raised position when the wedge 72 is in the second position.

With reference to FIGS. 2-4C, the slider 20 may include wedge guides 78 spaced from each other along the axis A. The wedge guides 78 may be elongated transverse to the axis A, e.g., in the vehicle fore-and-aft direction Da. The wedge guides 78 may be fixed to the slider 20, e.g., by fasteners, welding, adhesive, etc. The wedge guides 78 may support the wedge 72 on the slider 20. For example, the wedge 72 may be disposed between the wedge guides 78. Specifically, the wedge 72 may abut each wedge guide 78. The wedge 72 may be slidable relative to the wedge guides 78. The wedge guides 78 may be any suitable material, e.g., metal, plastic, etc.

The pyrotechnic actuator 26 may be any actuator that ignites a combustible material. For example, the pyrotechnic actuator 26 may include a pyrotechnic charge that produces gas or otherwise rapidly expands upon actuation. The pyrotechnic actuator 26 may, for example, include a cylinder 80 and a piston 82 disposed in the cylinder 80, as shown in FIGS. 3A, 4A, and 4B. The piston 82 may be moveable relative to the cylinder 80 from a charged position to a discharged position. The piston 82 may be disposed adjacent to one end of the cylinder 80 in the charged position, as shown in FIGS. 3A and 4B, and the piston 82 may be disposed closer to the other end of the cylinder 80 in the discharged position, as shown in FIG. 4A. In other words, the piston 82 may move from one end towards the other end of the cylinder 80 when the pyrotechnic actuator 26 is actuated.

The pyrotechnic actuator 26 may be fixed to the slider 20. For example, one or more fasteners, welding, etc. may secure the pyrotechnic actuator 26 to the slider 20. The pyrotechnic actuator 26 may be disposed between the opening 64 of the slider 20 and the second portion of one extension 58, as shown in FIGS. 2-4C. Specifically, the second end 76 of the wedge 72 and the pyrotechnic actuator 26 may be disposed adjacent to opposite extensions 58. The pyrotechnic actuator 26 may be elongated along the axis A.

With continued reference to FIGS. 2-4C, the pyrotechnic actuator 26 may include a wire 84 elongated along the axis A. The wire 84 may, for example, be coiled about the axis A. The coil allows the wire 84 to extend along the axis A during movement of the slider 20 relative to the track 16, i.e., along the axis A. In other words, the wire 84 may be extendable from a coiled position to an uncoiled position. In the coiled position, the slider 20 may, for example, be spaced from the stopper 62, i.e., when the D-ring 22 is in one first position. In other words, the wire 84 may extend when the slider 20 moves downwardly along the track 16 and may contract when the slider 20 moves upwardly along to the track 16. When the pin 24 is releasably engaged by the pyrotechnic actuator 26, the wire 84 may extend from the coiled position to the uncoiled position. In other words, the wire 84 may be in the uncoiled position when the slider 20 abuts the stopper 62, i.e., when the D-ring 22 is in the second position. The wire 84 may extend to, e.g., a power source that provides electrical energy to the pyrotechnic actuator 26. The wire 84 may be any suitable material, e.g., copper.

With continued reference to FIGS. 2-4C, the seatbelt height adjuster 14 may include a cable 86 extending from the pyrotechnic actuator 26 to the first end 74 of the wedge 72. Specifically, the cable 86 may be fixed to the pyrotechnic actuator 26, e.g., the piston 82, and the first end 74 of the wedge 72. The cable 86 may be in tension between the pyrotechnic actuator 26 and the wedge 72. The cable 86 may, for example, transfer force generated by the pyrotechnic actuator 26 to the wedge 72, e.g., to move the wedge 72 from the first position to the second position when the pyrotechnic actuator 26 is actuated from the charged position to the discharged position. The cable 86 may be any suitable material, e.g., woven polymer, nylon, etc.

With reference to FIGS. 2, 3A, 4A, and 4B, the seatbelt height adjuster 14 may include a pulley 88 spaced from the wedge 72 and the pyrotechnic actuator 26. The pulley 88 may, for example, be spaced from the wedge 72, e.g., the first end 74, in the vehicle fore-and-aft direction Da. Additionally, the pulley 88 may be spaced from the pyrotechnic actuator 26 along the axis A. The cable 86 may be engaged with the pulley 88. In other words, the pulley 88 may guide the cable 86 and maintain tension in the cable 86.

The pyrotechnic actuator 26 may be designed to release the pin 24 from the locked position to the unlocked position. When actuated from the charged position to the discharged position, the pyrotechnic actuator 26, e.g., the piston 82, may pull the cable 86. The cable 86 may transfer the force of the pyrotechnic actuator 26, e.g., the piston 82, through the pulley 88 and to the first end 74 of the wedge 72, which pulls the wedge 72 from the first position to the second position. When the wedge 72 moves from the first position to the second position, the second end 76 of the wedge 72 moves towards the leaf spring 66, which pivots the leaf spring 66 from the lowered position to the raised position. When the leaf spring 66 pivots from the lowered position to the raised position, the pin 24 releases from the locked position to the unlocked position. In the unlocked position, the slider 20 may slide relative to the track 16 along the axis A. In this situation, the slider 20 may impact the stopper 62, and the stopper 62 may prevent further downward movement of the slider 20 relative to the track 16.

The seatbelt height adjuster 14 may include a bracket 90 engaged with the second slot of the pillar trim 42. Said differently, the bracket 90 may be accessible by the occupant through the second slot. For example, the bracket 90 may be disposed in the second slot of the pillar trim 42. Alternatively, the bracket 90 may extend through the second slot.

With reference to FIGS. 2-4C, the bracket 90 may be engaged with the wedge 72. For example, the bracket 90 may be fixed to the second end 76 of the wedge 72. The bracket 90 may have any suitable shape. For example, the bracket 90 may have a "U-shape." The bracket 90 may be any suitable material, e.g., metal, plastic, etc. The bracket 90 may be fixed to the wedge 72 in any suitable manner, e.g., fasteners, welding, adhesive, etc.

With continued reference to FIGS. 2-4C, the bracket 90 may include a base 92 spaced from the wedge 72 in the vehicle fore-and-aft direction Da. One side 54 of the track 16 may, for example, be disposed between the wedge 72 and the base 92 of the bracket 90. In other words, the bracket 90 may extend from the wedge 72 across one side 54 of the track 16 to the base 92. The bracket 90 may include two legs 94 spaced from each other in the cross-vehicle direction Dc. One leg 94 may extend from the wedge 72, e.g., the second end 76, to the base 92 and the other leg 94 may extend from the base 92 towards the track 16. In other words, one leg 94 of the bracket 90 may be fixed to the second end 76 of the wedge 72. In this situation, the bracket 90 may extend around one side 54 of the track 16.

With continued reference to FIGS. 2-4C, the bracket 90 may include a spring 96 extending from the base 92 towards the track 16. In other words, the spring 96 may be disposed between the legs 94 of the bracket 90. The spring 96 may include a first end (not numbered) fixed to the base 92 and a second end (not numbered) spaced from the base 92. The second end may, for example, be disposed in the groove 60 of the track 16. In this situation, the second end of the spring 96 may be slidably engaged with the groove 60 of the track 16. In other words, the second end of the spring 96 may slide relative to the groove 60. The second end of the spring 96 may be directly engaged with the groove 60. Alternatively, the bracket 90 may include an auxiliary slider (not shown) disposed in the groove 60 of the track 16 and slidably engaged with the groove 60. In this situation, the second end of the spring 96 may be fixed to the auxiliary slider. As another example, the second end of the spring 96 may be fixed to the slider 20.

The bracket 90 may be moveable from an engaged position, as shown in FIGS. 3A and 3B, to a disengaged position, as shown in FIGS. 4B and 4C. In the engaged position, the bracket 90 may be fixed relative to the track 16. In the disengaged position, the bracket 90 may be moveable relative to the track 16. For example, the bracket 90 may slide along the axis A relative to the track 16. During movement of the bracket 90 from the engaged position to the disengaged position, the bracket 90 may move in the cross-vehicle direction Dc relative to the track 16. When the bracket 90 moves from the engaged position to the disengaged position, the bracket 90 moves the wedge 72 from the first position to the second position. In other words, the bracket 90 may be engaged with, i.e., fixed relative to, the wedge 72. Said differently, the wedge 72 is in the first position when the bracket 90 is in the engaged position, and the wedge 72 is in the second position when the bracket 90 is in the disengaged position. The spring 96 may bias the bracket 90 to the engaged position. In other words, the spring 96 may bias the wedge 72 in the first position.

The bracket 90 may be designed to move the pin 24 between the locked position and the unlocked position. In other words, the bracket 90 may be engaged with the pin 24 and the leaf spring 66. Said differently, the pin 24 may be moveable by the bracket 90 and the leaf spring 66 may be pivotable by the bracket 90. For example, the bracket 90 may be moved to the disengaged position by the occupant. Specifically, the occupant may apply a force F, e.g., manually, to the bracket 90 sufficient to compress the spring 96 and move the bracket 90 to the disengaged position, as shown in FIG. 4B. When the bracket 90 moves to the disengaged position, the wedge 72 moves to the second position. In this situation, the cable 86 may have slack between the first end 74 of the wedge 72 and the pyrotechnic actuator 26. When the wedge 72 moves from the first position to the second position, the wedge 72 moves relative to the leaf spring 66, which pivots the leaf spring 66 from the lowered position to the raised position. When the leaf spring 66 pivots from the lowered position to the raised position, the pin 24 releases from the locked position to the unlocked position. In the unlocked position, the slider 20 may slide relative to the track 16 along the axis A. In other words, the bracket 90 may be manually moved to release the pin 24 from the locked position, which allows the occupant to manually slide the slider 20 relative to the track 16. When the occupant releases the bracket 90, the spring 96 biases the bracket 90 to the engaged position and the wedge 72 to the first position. When the wedge 72 moves to the first position, the leaf spring 66 pivots to the lowered position, which moves the pin 24 to the locked position. In other words, the bracket 90 may be designed to allow the occupant to manually adjust the height of the D-ring 22.

Figure 5:
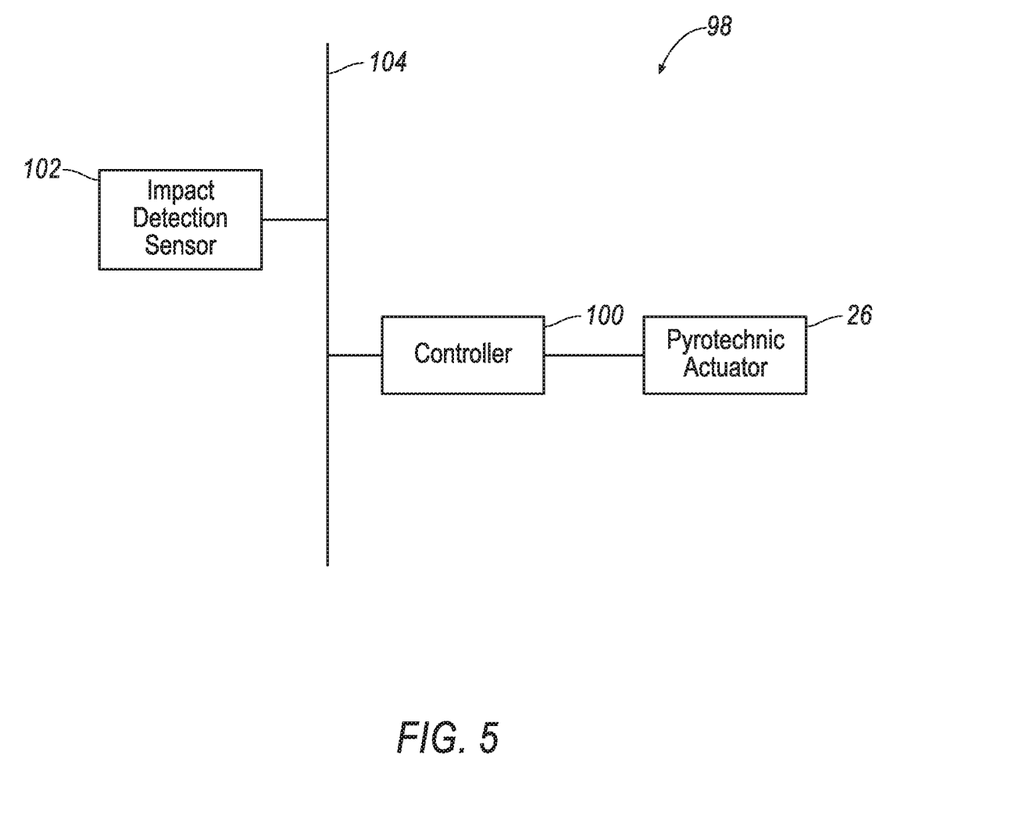
FIG. 5 is a block diagram of an impact sensing system of the vehicle.

With reference to FIG. 5, the vehicle 10 may include an impact sensing system 98. The impact sensing system 98 may include a controller 100, an impact sensor 102, and the pyrotechnic actuator 26 in communication through a communications network 104.

The impact sensor 102 may be in communication with the controller 100. The impact sensor 102 is programmed to detect an impact to the vehicle 10. The impact sensor 102 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 102 may be located at numerous points in or on the vehicle 10.

The controller 100 may be a microprocessor-based controller 100. The controller 100 may include a processor, memory, etc. The memory of the controller 100 may store instructions executable by the processor.

The control system may transmit signals through a communications network 104 such as a controller area network (CAN) bus, Ethernet, Local Interconnect Network (LIN), and/or by any other wired or wireless communications network 104.

The controller 100 may be programmed to actuate the pyrotechnic actuator 26 in response to detecting an oblique impact. For example, in response to receiving the signals from the impact detection sensors, the controller 100 may initiate the ignition of the pyrotechnic actuator 26. In other words, when the impact detection sensors detect an oblique impact, the controller 100 may send a signal to ignite the pyrotechnic actuator 26. In this situation, the pyrotechnic actuator 26 discharges to the discharged position, which releases the pin 24 from the locked position, as set forth above. When the pin 24 is in the unlocked position, the slider 20 may slide along the track 16 to the stopper 62. During movement of the slider 20 along the track 16, the seatbelt assembly 12 may limit chest compression on the occupant.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Under normal operating conditions, the pin 24 is engaged in the locked position. In other words, the D-ring 22 is fixed relative to the track 16. An occupant may manually adjust the height of the D-ring 22 by compressing the bracket 90. In this situation, the force from the occupant overcomes the biasing force of the spring 96 and moves the bracket 90 to the disengaged position, which moves the wedge 72 to the second position. When the wedge 72 moves to the second position, the wedge 72 pivots the leaf spring 66 to the raised position, which moves the pin 24 to the unlocked position. When the occupant releases the bracket 90, the spring 96 biases the bracket 90 to the engaged position, which moves the wedge 72 to the first position. When the wedge 72 moves to the first position, the leaf spring 66 pivots to the lowered position and biases the pin 24 to the locked position.

Additionally, in the event of a vehicle impact, e.g., an oblique impact, the impact detection sensor 102 detects the impact. The impact detection sensor 102 transmits a signal indicating the oblique impact to the controller 100 through the communications network 104. When the oblique impact is detected, the controller 100 transmits a signal through the communications network 104 triggering the ignition of the pyrotechnic actuator 26 to discharge. When the pyrotechnic actuator 26 discharges, the pin 24 is released from the locked position, and the slider 20 may slide freely along the track 16 until impacting the stopper 62. By releasing the pin 24 from the locked position during the oblique impact, the seatbelt height adjuster 14 allows the D-ring 22 to slide along the track 16, which may assist in redistributing the load on the occupant and assist in reducing chest compression on the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt height adjuster comprising:
   a track elongated along an axis and including a plurality of holes spaced from each other along the axis;
   a slider slideably coupled to the track;
   a D-ring supported by the slider;
   a pin supported by the slider and releasably engageable with one respective hole; and
   a pyrotechnic actuator supported by the slider and engaged with the pin.

2. The seatbelt height adjuster of claim 1, further comprising a processor and a memory storing instructions to actuate the pyrotechnic actuator in response to detecting an oblique impact.

3. The seatbelt height adjuster of claim 1, wherein the pyrotechnic actuator is designed to release the pin from a locked position to an unlocked position.

4. The seatbelt height adjuster of claim 1, further comprising a bracket supported by the slider and engaged with the pin, the bracket is designed to release the pin from a locked position to an unlocked position.

5. The seatbelt height adjuster of claim 1, further comprising a spring supported by the slider and engaged with the pyrotechnic actuator, the spring fixed to the pin and biasing the pin towards one respective hole.

6. The seatbelt height adjuster of claim 1, further comprising a leaf spring supported by the slider and engaged with the pyrotechnic actuator, the leaf spring fixed to the pin and biasing the pin towards one respective hole.

7. The seatbelt height adjuster of claim 6, wherein the leaf spring is pivotable relative to the slider from a lowered position to a raised position by the pyrotechnic actuator, the pin is engaged with the track when the leaf spring is in the lowered position and is disengaged from the track when the leaf spring is in the raised position.

8. The seatbelt height adjuster of claim 6, further comprising a wedge supported by the slider and engaged with the pyrotechnic actuator, the wedge compressed between the leaf spring and the slider.

9. The seatbelt height adjuster of claim 8, wherein the wedge is slidable from a first position to a second position by the pyrotechnic actuator, the pin is engaged with the track when the wedge is in the first position and is disengaged with the track when the wedge is in the second position.

10. The seatbelt height adjuster of claim 9, wherein the leaf spring is pivotable relative to the slider from a lowered position to a raised position by the wedge, the leaf spring is in the lowered position when the wedge is in the first position and is in the raised position when the wedge is in the second position.

11. The seatbelt height adjuster of claim 8, wherein the wedge is elongated transverse to the leaf spring.

12. The seatbelt height adjuster of claim 8, wherein the slider includes wedge guides spaced from each other along the axis, the wedge extending from one wedge guide to the other wedge guide.

13. The seatbelt height adjuster of claim 8, further comprising a cable extending from the pyrotechnic actuator to the wedge.

14. The seatbelt height adjuster of claim 8, further comprising a bracket fixed relative to the wedge and including a base spaced from the wedge, the bracket extending partially around the track.

15. The seatbelt height adjuster of claim 14, wherein the wedge is slidable from a first position to a second position by the bracket, the pin is engaged with the track when the wedge is in the first position and is disengaged with the track when the wedge is in the second position by the bracket.

16. The seatbelt height adjuster of claim 15, wherein the bracket includes a second spring extending from the base to the track, the spring biasing the wedge in the first position.

17. The seatbelt height adjuster of claim 15, wherein the leaf spring is pivotable relative to the slider from a lowered position to a raised position by the wedge, the leaf spring is in the lowered position when the wedge is in the first position and is in the raised position when the wedge is in the second position.

18. The seatbelt height adjuster of claim 1, further comprising a stopper fixed to the track, the slider engageable with the stopper.

19. The seatbelt height adjuster of claim 1, wherein the pyrotechnic actuator includes a wire elongated along the axis, the wire coiled about the axis.

20. The seatbelt height adjuster of claim 1, further comprising a webbing extending through the D-ring.

\* \* \* \* \*